(12) United States Patent
Fripp et al.

(10) Patent No.: US 12,180,823 B2
(45) Date of Patent: Dec. 31, 2024

(54) REAL-TIME MONITORING OF SWELLPACKERS

(71) Applicant: Halliburton Energy Services, Inc., Houston, TX (US)

(72) Inventors: Michael Linley Fripp, Singapore (SG); Luke William Holderman, Singapore (SG); Jalpan Piyush Dave, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/577,086

(22) Filed: Jan. 17, 2022

(65) Prior Publication Data
US 2023/0228183 A1    Jul. 20, 2023

(51) Int. Cl.
*E21B 47/00* (2012.01)
*E21B 33/12* (2006.01)
*G01N 27/12* (2006.01)
*G01N 27/22* (2006.01)
*G01N 27/72* (2006.01)

(52) U.S. Cl.
CPC .......... *E21B 47/00* (2013.01); *E21B 33/1208* (2013.01); *G01N 27/12* (2013.01); *G01N 27/221* (2013.01); *G01N 27/72* (2013.01)

(58) Field of Classification Search
CPC ...... G01N 27/72; G01N 27/12; G01N 27/221; E21B 33/1208; E21B 47/00
See application file for complete search history.

(56) References Cited

U.S. PATENT DOCUMENTS

| | | | | |
|---|---|---|---|---|
| 4,125,822 A | * | 11/1978 | Perren | G01M 3/045 324/717 |
| 10,145,775 B2 | | 12/2018 | Savari et al. | |
| 2008/0018424 A1 | * | 1/2008 | Takahata | H01F 21/02 336/20 |
| 2010/0212883 A1 | * | 8/2010 | Emerson | E21B 47/007 166/66 |
| 2010/0212891 A1 | * | 8/2010 | Stewart | E21B 23/00 166/250.12 |
| 2012/0292023 A1 | | 11/2012 | Hinkie et al. | |
| 2012/0312560 A1 | | 12/2012 | Bahr et al. | |

(Continued)

FOREIGN PATENT DOCUMENTS

| | | | |
|---|---|---|---|
| EP | 3851631 | 7/2021 | |
| GB | 2475450 A * | 5/2011 | B32B 3/30 |

(Continued)

OTHER PUBLICATIONS

International Search Report and Written Opinion for Application No. PCT/US2022/015291, dated Oct. 11, 2022.

*Primary Examiner* — Theodore N Yao
(74) *Attorney, Agent, or Firm* — Scott Richardson; C. Tumey Law Group, PLLC

(57) ABSTRACT

A downhole packer system includes a swellable material configured to expand to seal against a wellbore wall in response to exposure to downhole fluids. The downhole packer system also includes at least one sensor disposed proximate the swellable material. The at least one sensor is configured to measure one or more electrical properties of the swellable material to determine a degree of expansion of the swellable material.

16 Claims, 5 Drawing Sheets

(56) References Cited

U.S. PATENT DOCUMENTS

| | | | | |
|---|---|---|---|---|
| 2015/0285060 | A1* | 10/2015 | Albinsson | E21B 43/01 |
| | | | | 166/337 |
| 2016/0245947 | A1* | 8/2016 | Clay | G01V 3/28 |
| 2016/0290046 | A1* | 10/2016 | Orban | E21B 47/007 |
| 2017/0292366 | A1* | 10/2017 | Ventura | G01N 27/121 |
| 2018/0087350 | A1* | 3/2018 | Sherman | C08K 3/08 |
| 2018/0238168 | A1* | 8/2018 | Roberson | C09K 8/40 |

FOREIGN PATENT DOCUMENTS

| | | |
|---|---|---|
| GB | 2475450 | 11/2011 |
| WO | 2019-164499 | 8/2019 |

* cited by examiner

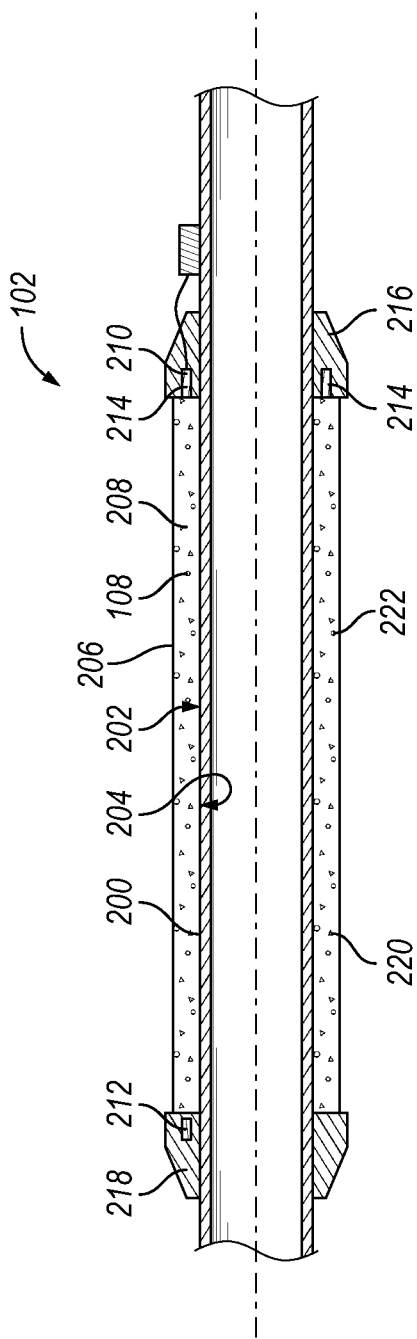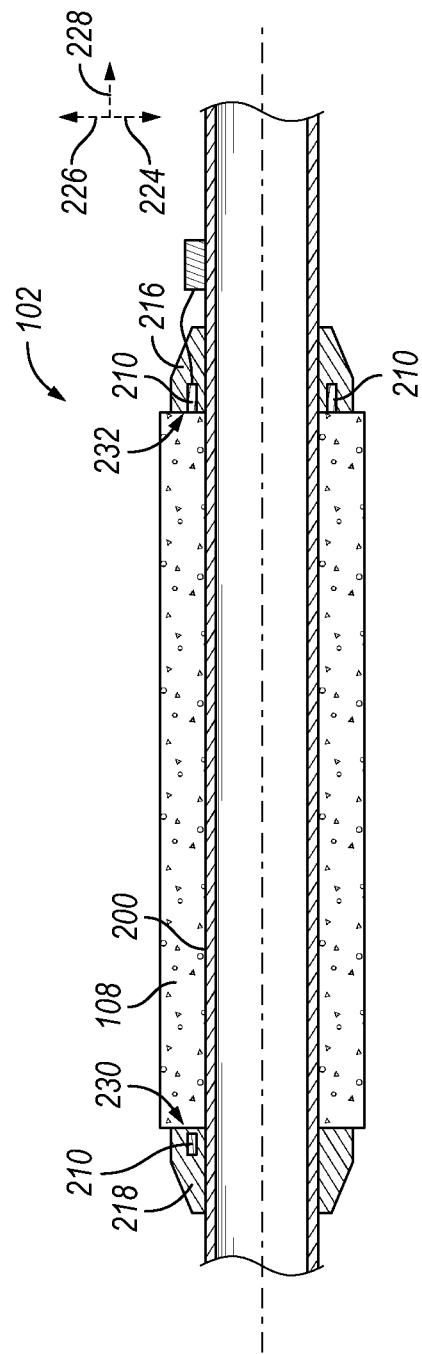
FIG. 2A
FIG. 2B

REAL-TIME MONITORING OF SWELLPACKERS

BACKGROUND

In some wellbore operations, one or more swell packer assemblies may be installed in a wellbore. Generally, swell packer assemblies are run into a wellbore in a contracted state during completion operations. With the packer assembly positioned in a desired location in the wellbore, the packer assemblies may be configured to expand from the contracted state to an expanded state and seal against a wellbore wall. Some swell packer assemblies may begin to expand while being run into the wellbore based on exposure to downhole fluids. Unfortunately, a rate of expansion of swell packer assemblies may vary based at least in part on downhole conditions, as well as variations in packer assemblies. Without knowing how much the swell packer assemblies have swelled, pressure may be applied to the swell packer assemblies prematurely, or wellbore operations may be delayed even though the swell packer assemblies have fully expanded, which may hinder wellbore operations.

BRIEF DESCRIPTION OF THE DRAWINGS

These drawings illustrate certain aspects of some of the embodiments of the present disclosure and should not be used to limit or define the method.

FIGS. 2A & 2B illustrate cross-sectional views of a swellable packer seal in a pre-expanded position and an expanded position, respectively, in accordance with some embodiments of the present disclosure.

DETAILED DESCRIPTION

Disclosed herein are downhole packer systems (e.g., swell packers) configured to determine a degree of expansion of a swellable material (e.g., swellable elastomer seal or swellable metal seal) of the swell packer. As set forth in detail below, the downhole packer system includes at least one sensor that measures one or more electrical properties of the swellable material to determine the degree of expansion of the swellable material. Accordingly, the downhole packer system may determine whether the swell packer is fully expanded such that wellbore operations may proceed without delay. Further, determining whether the swell packer is fully expanded may reduce a risk of proceeding with wellbore operations without having the swell packer sealed against a wellbore wall.

Figure 1:
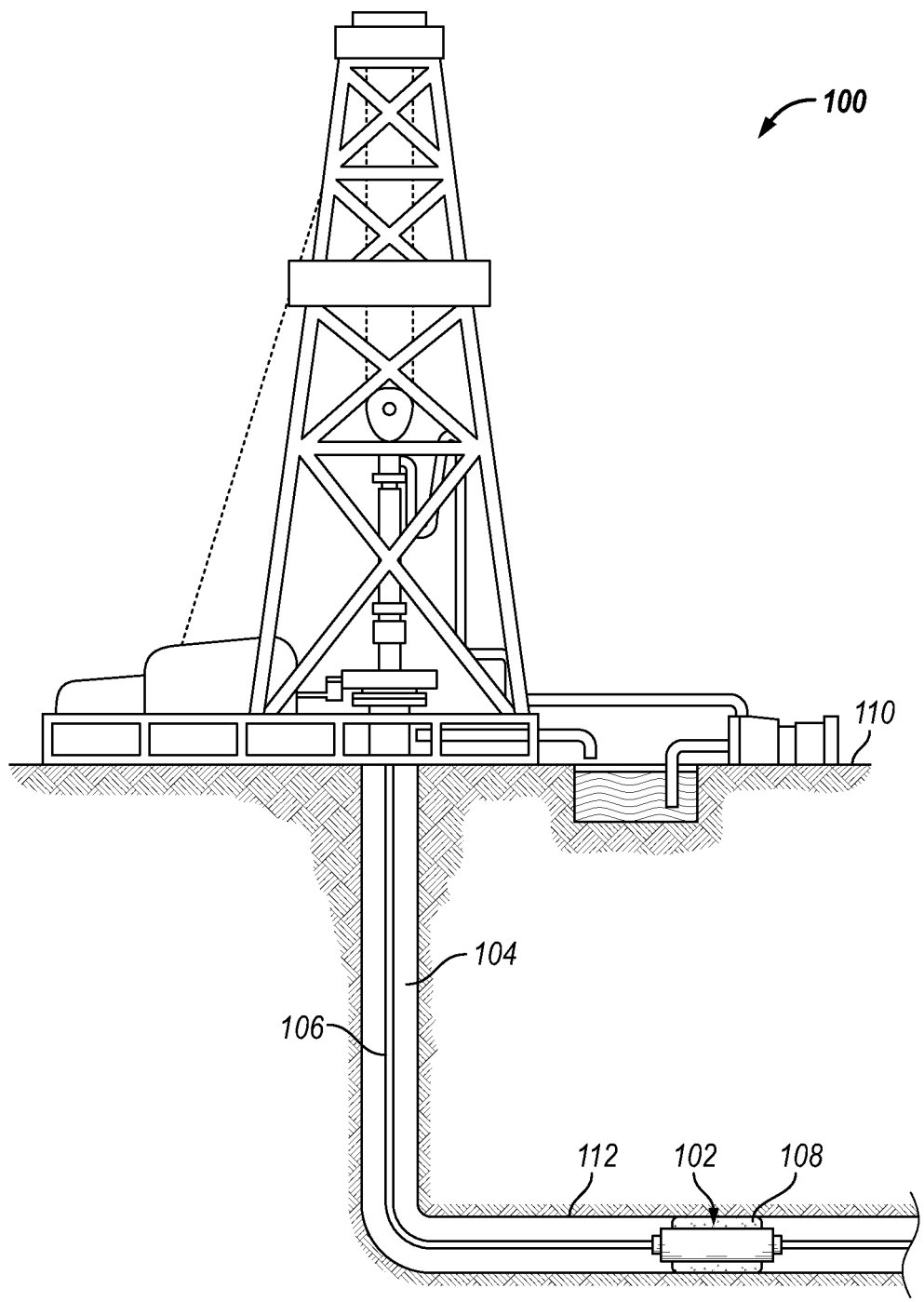
FIG. 1 illustrates a wellbore completion system having a swellable packer disposed in a wellbore, in accordance with some embodiments of the present disclosure.

FIG. 1 illustrates a wellbore completion system 100 having a downhole packer system (e.g., swell packer 102) disposed in a wellbore 104, in accordance with some embodiments of the present disclosure. As illustrated, the swell packer 102 may be run-in-hole via a conveyance 106 (e.g., coiled tubing, segmented tubing, etc.) Once the swell packer 102 is run-in-hole to a desired location in the wellbore 104, the conveyance 106 may hold the swell packer 102 in the desired position. The swell packer 102 may include a swellable material 108 configured to expand in response to exposure to downhole fluids in the wellbore 104. In some embodiments, the swellable material 108 may expand in response to absorbing downhole fluid. Alternatively, exposure of the swellable material 108 to the downhole fluid may be configured to initiate a chemical reaction configured to cause the swellable material 108 to expand. Expansion of the swellable material 108 may begin while the swell packer 102 is run-in-hole or at the desired location in the wellbore 104 based at least in part on the presence of downhole fluids in the wellbore 104. In some embodiments, fluid from the surface 110 may be pumped through the conveyance 106 and into the wellbore 104 to initiate expansion of the swellable material 108. The swellable material 108 may expand to seal the swell packer 102 against a wellbore wall 112 of the wellbore 104.

FIGS. 2A & 2B illustrate cross-sectional views of a swellable packer seal in a pre-expanded state and an expanded state, respectively, in accordance with some embodiments of the present disclosure. With regard to FIG. 2A, the swell packer 102 comprises the swellable packer seal (e.g., the swellable material 108) disposed about a mandrel 200 in a pre-expanded state. The swellable material 108 may have a hollow cylindrical shape with a radially inner seal surface 202 configured to interface a radially outer mandrel surface 204 of the mandrel 200. Further, a radially outer seal surface 206 of the swellable material 108 may be exposed to the wellbore 104 such that at least the radially outer seal surface 206 of the swellable material 108 may be exposed to downhole fluids in the wellbore 104 when the swell packer 102 is run-in-hole.

As set forth above, the swellable material 108 is configured to expand to seal against a wellbore wall 112 (shown in FIG. 1) in response to exposure to downhole fluids. For example, the swellable material 108 may comprise a swellable elastomer seal 208 configured to absorb downhole fluid. As the swellable elastomer seal 208 absorbs the downhole fluid, the swellable elastomer seal 208 may increase in volume. The increase in volume may cause the swellable elastomer seal 208 to expand in a radially outward direction, with respect to the mandrel 200, to interface with and seal against the wellbore wall 112. In some embodiments, the swellable elastomer seal 208 may be configured such that the swellable elastomer seal 208 continues to expand after contacting the wellbore wall 112 to increase the sealing pressure of the swell packer 102.

Alternatively, the swellable material 108 may comprise a swellable metal seal disposed about the mandrel. The swellable metal seal may comprise a particular metal alloy material configured to undergo a chemical reaction in response to exposure to downhole fluids. The chemical reaction may cause the metal alloy material to transform into a rock-like material. As the metal alloy material transforms into the rock-like material, the swellable metal seal may expand. In particular, the swellable metal seal may expand in the radially outward direction, with respect to the mandrel, such that the swellable metal seal may interface with and seal against the wellbore wall 112. The swellable metal seal may include any suitable alloy configured to expand in response to exposure to the downhole fluids.

Moreover, the swell packer 102 comprises at least one sensor 210. The at least one sensor 210 may be disposed proximate the swellable material 108 (e.g., the swellable elastomer seal 208 or the swellable metal seal). The at least one sensor 210 is configured to measure one or more electrical properties of the swellable material 108 to determine a degree of expansion of the swellable material 108. As set forth below, the at least one sensor 210 may include any suitable sensor for measuring capacitance and/or inductance of the swellable material 108. In particular, the at least one sensor 210 may include any suitable sensor for measuring dielectric permittivity, magnetic permeability, and/or electrical resistance (e.g., resistivity) of the swellable material 108. In some embodiments, the at least one sensor 210 may include a plurality of sensors. For example, swell packer 102 may include an inductive sensor 212, as well as a series of capacitive sensors 214. Using a plurality of sensors may provide additional data for determining the degree of expansion of the swellable material 108. However, a single sensor may provide adequate data for determining the degree of expansion of the swellable material 108.

As illustrated, the at least one sensor 210 may comprise a capacitive sensor 214 disposed proximate the swellable material 108. In particular, the capacitive sensor 214 may be disposed in an end ring (e.g., a lower end ring 216 or an upper end ring 218) of the swell packer 102. Alternatively, the capacitive sensor 214 may be secured to the mandrel 200 or disposed within the swellable material 108 itself. Moreover, the capacitive sensor 214 may be configured to detect a dielectric permittivity of the swellable material 108. As the swellable material 108 expands, the dielectric permittivity of the swellable material 108 may change. For example, the swellable material 108 (e.g., swellable elastomer seal) may absorb water-based fluid to expand. As the water-based fluid may have a higher dielectric permittivity than the swellable material 108, the dielectric permittivity detected by the capacitive sensor 214 may increase as the swellable material 108 expands. Further, as set forth in greater detail below, the degree of expansion of the swellable material 108 may be determined based at least in part on changes in the detected dielectric permittivity of the swellable material 108. In some examples, the term dielectric permittivity is defined as either the real part or the imaginary part of the measured dielectric permittivity. Further, in some examples, the term dielectric permittivity is defined as either an AC measurement or a DC measurement.

In some embodiments, the swellable material 108 (e.g., the swellable elastomer seal) may be doped with high dielectric particles 220 to increase the dielectric permittivity of the swellable material 108. For example, the swellable material 108 may absorb hydrocarbon-based fluid (e.g., oil) to expand. The swellable material 108 may have a similar dielectric permittivity to the hydrocarbon-based fluid. As such, changes in the dielectric permittivity detected by the capacitive sensor 214 may be minor as the swellable elastomer seal 208 absorbs the hydrocarbon-based fluid. However, the doped swellable material 108 may have a measurably higher dielectric permittivity than the hydrocarbon-based fluid. Accordingly, as the doped swellable material 108 absorbs the oil, the dielectric permittivity detected by the capacitive sensor 214 may decrease as the doped swellable material expands such that the degree of expansion of the swellable material 108 may be determined. Moreover, the high dielectric particles 220 for doping the swellable material 108 may comprise copper calcium titanate, barium titanate, alumina, magnesia, carbon, metals, or any suitable particle configured to increase dielectric permittivity of the swellable material.

Further, as illustrated, the at least one sensor may comprise an inductive sensor disposed proximate the swellable material 108. In particular, the inductive sensor 212 may be disposed in an end ring 216, 218 of the swell packer 102. Alternatively, the inductive sensor 212 may be secured to the mandrel 200. The inductive sensor 212 may be configured to detect a magnetic permeability of the swellable material 108. As the swellable material 108 expands, the magnetic permeability of the swellable material 108 may change such that the degree of expansion of the swellable material 108 may be determined. In some examples, the term magnetic permeability is defined as either the real part or the imaginary part of the measured magnetic permeability. Further, in some examples, the term magnetic permeability is defined as either an AC measurement or a steady state measurement. In some examples, the steady state magnetic permeability measurement is a measure of the magnetic flux or the magnetic field through the material.

The swellable material (e.g., the swellable elastomer seal) may be doped with a magnetic responsive material (e.g., ferromagnetic particles 222) to increase a magnetic permeability of the swellable material (e.g., the swellable elastomer seal). For example, the swellable material may absorb water-based fluid and/or hydrocarbon-based fluid to expand. The magnetic permeability of the swellable material may be similar to the magnetic permeability of the water-based fluid and/or hydrocarbon-based fluid such that changes in the magnetic permeability may be undetectable as the swellable material expands. However, the swellable material doped with ferromagnetic particles may have a higher magnetic permeability than the water-based fluid and/or hydrocarbon-based fluid. Thus, as the doped swellable material absorbs the fluid, the magnetic permeability detected by the inductor may decrease as the doped swellable material expands. As such, that the degree of expansion of the swellable material 108 may be determined based at least in part on the change in detected magnetic permeability. Moreover, the magnetic responsive material (e.g., ferromagnetic particles 222) may comprise iron, nickel, chromium dioxide, ferrite, and/or any suitable ferromagnetic particle configured to increase the magnetic permeability of the swellable material.

Further, the at least one sensor 210 may comprise a high-frequency inductive sensor 212 configured to detect electrical resistance of the swellable material 108. In some examples, the inductive sensor 212 may transmit at a frequency between steady state to 100 GHz. In some examples, the AC frequency of evaluation is between 0.01 Hz to 100 GHz. In some examples, a high-frequency signal is defined as any signal above 1 kHz, and any frequency below 1 kHz is defined as a low-frequency signal. Moreover, the high frequency inductive sensor 212 may be configured to transmit a high frequency magnetic field and detect eddy currents induced in the swellable material 108 via the high frequency magnetic field. The electrical resistance of the swellable material 108 may be detected based at least in part on the induced eddy currents, and the degree of expansion of the swellable material 108 may be determined based at least in part on changes in the detected electrical resistance of the swellable material 108. For example, in response to the chemical reaction cause by exposure to the downhole fluids, the swellable material 108 (e.g., swellable metal seal) may transform from a metal alloy to a rock-like material causing the swellable material 108 to expand from the pre-expanded state to the expanded state (shown in FIG. 2B). In the pre-expanded state, the swellable material 108 (e.g., metal alloy) may be conductive with a resistivity between $20 \times 10^{-9}$ to $50 \times 10^{-9}$ ohms/meter. During the transformation, the swellable material (e.g., metal alloy) may become progressively less electrically conductive (e.g., more resistive). Part way through the transformation, the swellable material (e.g., partial metal alloy) may have a resistivity similar to the downhole fluid (e.g., 0.2 ohms/meter). Further, in the fully transformed/expanded state, the swellable material (e.g., the rock-like material) may have a measurably higher resistivity (e.g., $1.0 \times 10^4$ ohms/meter) than the pre-expanded state. As such, the degree of expansion of the swellable material 108 may be determined based at least in part on the change in detected electrical resistance of the swellable material 108.

The wellbore completion system 100 and/or the swell packer 102 may further include a computer that is in communication (e.g., wired or wireless) with the at least one sensor 210. In some embodiments, the computer may be configured to determine the degree of expansion of the swellable material 108 based at least in part on the detected changes in the one or more electrical properties of the swellable material 108 received from the at least one sensor 210. Moreover, the computer may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. The computer may be any processor-driven device, such as, but not limited to, a personal computer, laptop computer, smartphone, tablet, handheld computer, dedicated processing device, and/or an array of computing devices. In addition to having a processor, the computer may include a server, a memory, input/output ("I/O") interface(s), and a network interface. The memory may be any computer-readable medium, coupled to the processor, such as RAM, ROM, and/or a removable storage device for storing data and a database management system ("DBMS") to facilitate management of data stored in memory and/or stored in separate databases. The computer may also include display devices such as a monitor featuring an operating system, media browser, and the ability to run one or more software applications such that an operator may view the determined degree of expansion and/or or other related data in real-time during installation operations. Additionally, the computer may include non-transitory computer-readable media. Non-transitory computer-readable media may include any instrumentality or aggregation of instrumentalities that may retain data and/or instructions for a period.

FIG. 2B discloses the swell packer 102 having the swellable material 108 disposed about the mandrel 200 in the expanded state. As illustrated, the swellable material 108 may expand to seal against the wellbore wall 112 in the expanded state. As set forth above, the swellable material 108 is configured to expand in response to exposure to the downhole fluids. For example, the swellable material 108 may expand in response to absorbing water-based fluid and/or hydrocarbon-based fluid or in response to a chemical reaction with the downhole fluid. However, if unrestrained, the swellable material 108 may expand in multiple directions (e.g., radially inner direction 224, radially outer direction 226, axial direction 228, etc.) with respect to the mandrel 200. To facilitate increased expansion in the radially outer direction 226 toward the wellbore wall 112, the swellable material 108 may be restrained from expanding in the radially inner direction 224 and the axial direction 228. The radially outer mandrel surface 204 may restrain expansion of the swellable material 108 in the radially inner direction 224. Further, the mandrel 200 may comprise an upper end ring 218 and a lower end ring 216 configured to restrain expansion of the swellable material 108 in the axial direction 228. In the pre-expanded state (e.g., shown in FIG. 2A), the swellable material 108 is disposed axially between the upper end ring 218 and the lower end ring 216. Axial ends (e.g., an upper axial seal end 230 and a lower axial seal end 232) of the swellable material 108 may be in contact with the upper end ring 218 and the lower end ring 216 such that the end rings may restrain expansion of the swellable material 108 in the axial direction 228.

Moreover, in the expanded state, the at least one sensor 210 may cease to detect changes in the one or more electrical properties of the swellable material 108. That is, a rate of change of the one or more electrical properties may be substantially zero at full expansion of the swellable material 108 since the swellable material 108 is no longer absorbing fluid or undergoing a chemical reaction. As such, the fully expanded state of the swellable material may be determined based at least in part on detecting a substantially constant electrical property (e.g., dielectric permittivity, magnetic permeability, or electrical resistance) for the swellable material 108. Determining that the swellable material is in the expanded state, in real-time, may improve efficiency of wellbore operations.

Figure 3A:
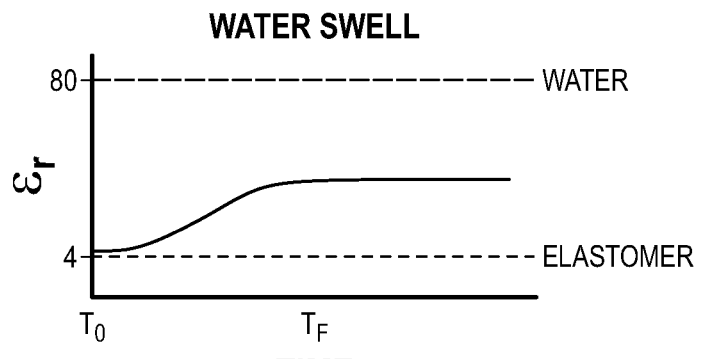
FIGS. 3A-3C illustrate graphs of dielectric permittivity during expansion of various swellable packers, in accordance with some embodiments of the present disclosure.
Figure 3B:
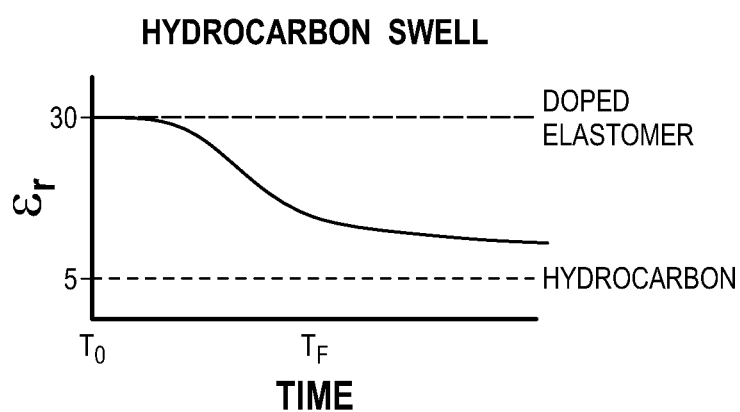
Figure 3C:
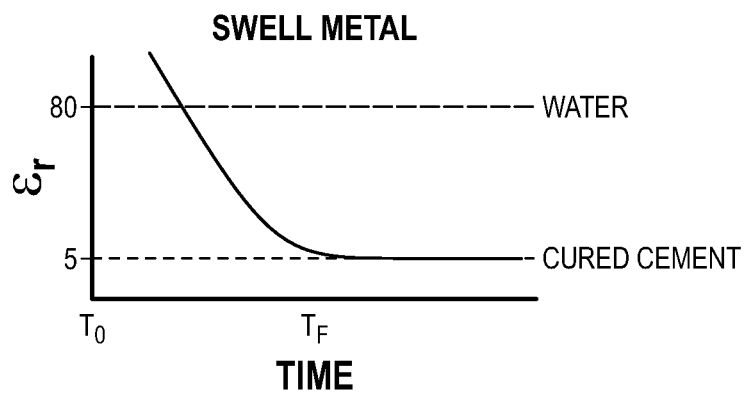

FIGS. 3A-3C illustrate graphs of dielectric permittivity during expansion of various swell packers, in accordance with some embodiments of the present disclosure. As set forth above, the degree of expansion of the swellable material 108 may be determined based at least in part on changes of dielectric permittivity of the swellable material 108 over time. As such, each swell packer 102 may have at least one respective sensor configured to detect dielectric permittivity. In particular, the at least one respective sensor may include a capacitive sensor 214 for detecting the dielectric permittivity of the swellable material 108 of the respective swell packer 102. FIG. 3A discloses a graph of dielectric permittivity over time for a swell packer 102 having the swellable material 108 (e.g., the swellable elastomer seal) configured to absorb a water-based fluid to expand. As the swellable material 108 expands, the dielectric permittivity of the swellable material 108 may change. As illustrated, the dielectric permittivity of the swellable elastomer seal may increase in response to absorbing the water-based fluid. In the pre-expanded state (i.e., prior to absorbing the water-based fluid), the swellable elastomer seal may comprise a relative dielectric permittivity between 2.0 to 4.0. In the illustrated graph, the swellable elastomer seal is in the pre-expanded state at a first time of measurement ($T_O$). Moreover, the water-based fluid may have a higher dielectric permittivity than the swellable material 108. For example, the water-based fluid may have a relative dielectric permittivity of about 80. As such, the dielectric permittivity of the swellable material 108 increases as the swellable material 108 absorbs the water-based fluid. As illustrated, the graph shows the increase in the dielectric permittivity as the water-based fluid is absorbed by the swellable material 108 over time (e.g., $T_O$-$T_F$). As shown, the dielectric permittivity of the swellable material 108 remains substantially constant after $T_F$. Indeed, the swellable material 108 may be fully expanded at $T_F$. In the fully expanded state, swellable material 108 may cease to absorb the water-based fluid such that the dielectric permittivity of the swellable material 108 may remain substantially constant after $T_F$. An actual value of the dielectric permittivity in the expanded state may be an intermediate value between the respective dielectric permittivities of the swellable material 108 and the water-based fluid. The actual value of the dielectric permittivity at $T_F$ may be based at least in part on the material properties of the swellable material 108, properties of the water-based fluid (e.g., salt concentration, type of salt, etc.), and an amount of swell (e.g., an amount of water-based fluid absorbed).

Moreover, as set forth above, the degree of expansion of the swellable material 108 may be determined based at least in part on changes in the detected dielectric permittivity of the swellable material 108. In particular, the degree of expansion between $T_0$ and $T_F$ may be determined based on the rate of change of the dielectric permittivity, duration since $T_0$ (e.g., an initial change in the dielectric permittivity), material properties of the swellable material 108, properties of the water-based fluid, etc. Further, full expansion of the swellable material 108 (i.e., to seal against the wellbore) may be determined based at least in part on a detected constant dielectric permittivity following $T_0$. Indeed, as set forth above, the swellable material 108 may cease to absorb the water-based fluid in the fully expanded state such that the dielectric permittivity of the swellable material 108 may remain substantially constant after $T_F$.

FIG. 3B discloses a graph of dielectric permittivity over time for a swell packer 102 having the swellable material 108 (e.g., the swellable elastomer seal) configured to absorb a hydrocarbon-based fluid to expand. The swellable material 108 may be doped with high dielectric particles 220 to increase the dielectric permittivity of the swellable material 108. A non-doped swellable material 108 may have a similar dielectric permittivity to the hydrocarbon-based fluid. As such, changes in the dielectric permittivity may be minor as the non-doped swellable material absorbs the hydrocarbon-based fluid. However, the doped swellable material 108 may have a measurably higher dielectric permittivity than the hydrocarbon-based fluid. Thus, as the doped swellable material 108 expands, the dielectric permittivity of the swellable material 108 may measurably change As illustrated, the dielectric permittivity of the doped swellable material 108 may decrease in response to absorbing the hydrocarbon-based fluid. In the pre-expanded state (i.e., prior to absorbing the hydrocarbon-based fluid), the doped swellable material 108 may comprise a relative dielectric permittivity of about 30. In the illustrated graph, $T_0$ shows the doped swellable material 108 in the pre-expanded state. Moreover, the hydrocarbon-based fluid may have a lower dielectric permittivity than the doped swellable material 108. For example, the hydrocarbon-based fluid may have a relative dielectric permittivity between 2.5 to 3.0. As such, the dielectric permittivity of the doped swellable material 108 decreases as the doped swellable material 108 absorbs the hydrocarbon-based fluid. As illustrated, $T_0$-$T_F$ shows the decrease in the dielectric permittivity as the hydrocarbon-based fluid is absorbed by the doped swellable material 108. As shown, the dielectric permittivity of the doped swellable material 108 remains substantially constant after $T_F$. Indeed, the doped swellable material 108 may be fully expanded at $T_F$. In the fully expanded state, doped swellable material 108 may cease to absorb the hydrocarbon-based fluid such that the dielectric permittivity of the doped swellable material 108 may remain substantially constant after $T_F$. An actual value of the dielectric permittivity in the expanded state may be an intermediate value between the respective dielectric permittivities of the swellable material and the hydrocarbon-based fluid. The actual value of the dielectric permittivity at $T_F$ may be based at least in part on the material properties of the doped swellable material 108, properties of the hydrocarbon-based fluid, and an amount of swell (e.g., an amount of hydrocarbon-based fluid absorbed).

Moreover, as set forth above, the degree of expansion of the doped swellable material 108 may be determined based at least in part on changes in the detected dielectric permittivity of the doped swellable material 108. In particular, the degree of expansion between $T_0$ and $T_F$ may be determined based on the rate of change of the dielectric permittivity, duration since $T_0$ (e.g., an initial change in the dielectric permittivity), material properties of the doped swellable material 108, properties of the hydrocarbon-based fluid, etc. Further, full expansion of the doped swellable material 108 (i.e., sealing against the wellbore) may be determined based at least in part on a detected constant dielectric permittivity following $T_0$. As set forth above, the doped swellable material 108 may cease to absorb the hydrocarbon-based fluid in the fully expanded state such that the dielectric permittivity of the doped swellable material 108 may remain substantially constant after $T_F$.

FIG. 3C discloses a graph of dielectric permittivity over time for a swell packer 102 having the swellable metal material 108 (e.g., the swellable metal seal) configured to expand, via a chemical reaction, in response to exposure to downhole fluids. As the swellable material 108 expands, the dielectric permittivity of the swellable material 108 may change. Specifically, the dielectric permittivity of the swellable material 108 may decrease as the swellable material 108 expands (e.g., transforms from a metal alloy to rock-like material). In the pre-expanded state, the swellable material 108 (e.g., metal alloy) may comprise a relative dielectric permittivity greater than 1000. In the illustrated graph, $T_0$ shows the swellable material 108 in the pre-expanded state. Further, $T_0$-$T_F$ shows the dielectric permittivity of the swellable material 108 during expansion/transformation. In the expanded state, the swellable material 108 (e.g., rock-like material) may comprise a relative dielectric permittivity less than 10. In the illustrated graph, $T_F$ shows the swellable material 108 in the expanded state.

Moreover, as set forth above, the degree of expansion of the swellable material 108 may be determined based at least in part on changes in the detected dielectric permittivity of the swellable material 108. In particular, the degree of expansion between $T_0$ and $T_F$ may be determined based on the rate of change of the dielectric permittivity, duration since $T_0$ (e.g., an initial change in the dielectric permittivity), material properties of the swellable material 108, etc. Further, full expansion of the swellable material (i.e., to seal against the wellbore) may be determined based at least in part on a detected constant dielectric permittivity following $T_0$. As set forth above, the swellable material 108 may cease to transform (e.g., chemically react) in the fully expanded state such that the dielectric permittivity of the swellable material 108 may remain substantially constant after $T_F$.

In some embodiments, a range of dielectric permittivities of the rock-like material (e.g., at full expansion) may be known such that fully expansion of the swellable material 108 may be determined in response to the detected dielectric permittivity of the swellable material 108 being within the known range of dielectric permittivities for the rock-like material. For example, the known range of relative dielectric permittivities for the rock-like material may be between 3.0 to 10.0. As such, full expansion of the swellable material 108 may be determined in response to the detected relative dielectric permittivity of the swellable material 108 decreasing below 10.

Figure 4:
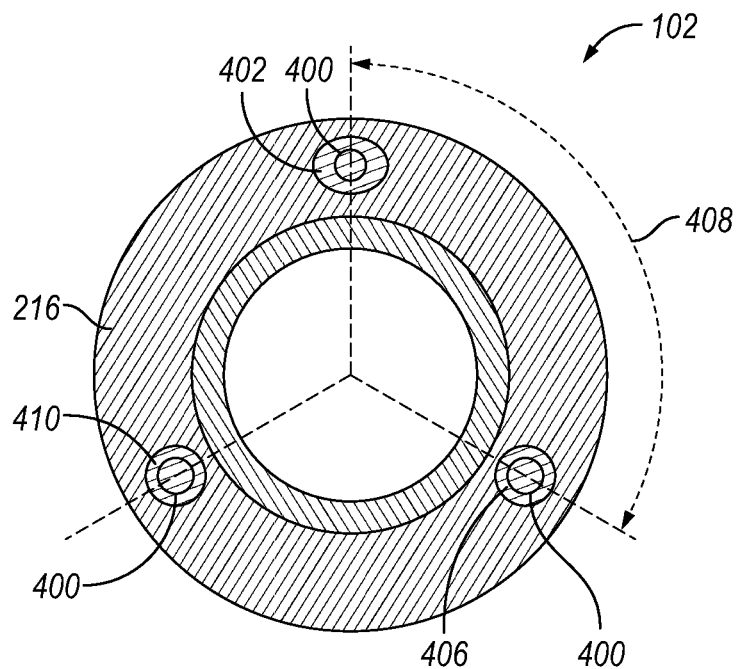
FIG. 4 illustrates a cross-sectional view of at least one point sensor disposed in an end ring of a swellable packer, in accordance with some embodiments of the present disclosure.

FIG. 4 illustrates a cross-sectional view of at least one point sensor 400 disposed in an end ring (e.g., lower end ring 216 or upper end ring 218) of a swell packer 102, in accordance with some embodiments of the present disclosure. As set forth above, the at least one sensor 210 may comprise a capacitive sensor and/or an inductive sensor. Further, the at least one sensor 210 may comprise at least one point sensor 400. In the illustrated embodiment, the at least one point sensor 400 includes three point sensors equally spaced from each about the lower end ring 216. That is, a first point sensor 402 is disposed at zero degrees with respect to a central axis 404 of the lower end ring 216, a second point sensor 406 is angularly offset from the first point sensor 402 by a first angle 408 of one-hundred and twenty degrees about the central axis 404, and a third point sensor 410 is angularly offset from the first point sensor 402 by two-hundred and forty degrees about the central axis 404. However, the point sensors 400 may be positioned in any suitable orientation. Further, in the illustrated embodiment, the point sensors 400 are disposed in the lower end ring 216 of the swell packer 102. However, in some embodiments, the point sensors 400 may be disposed in the upper end ring 218 and/or the lower end ring 216.

Figure 5:
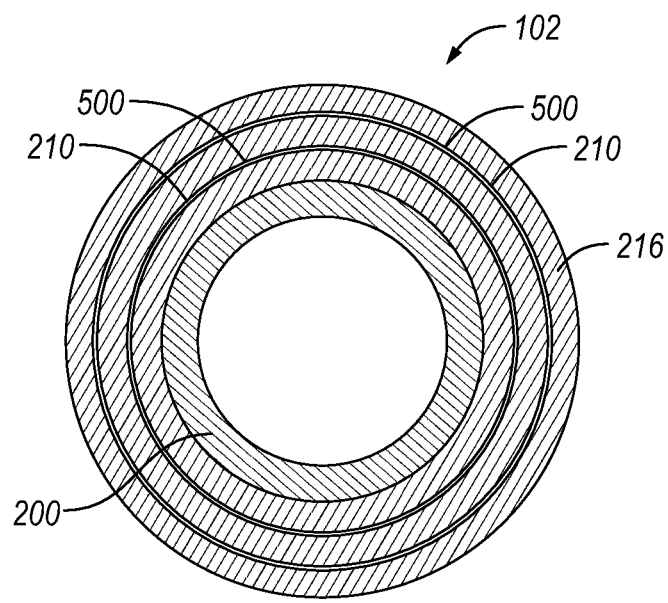
FIG. 5 illustrates a cross-sectional view of a ring sensor disposed in an end ring of a swellable packer, in accordance with some embodiments of the present disclosure.

FIG. 5 illustrates a cross-sectional view of at least one ring sensor 500 disposed in an end ring of a swell packer 102, in accordance with some embodiments of the present disclosure. As set forth above, the at least one sensor 210 may comprise a capacitive sensor and/or an inductive sensor. Further, the at least one sensor 210 may comprise at least one ring sensor 500 disposed in the lower end ring 216 of the swell packer 102. The lower end ring 216 is disposed about the mandrel 200. In some embodiments, the at least one ring sensor 500 may be disposed in the upper end ring 218 and/or the lower end ring 216 of the swell packer 102. Further, in some embodiments, the at least one ring sensor 500 may be configured to contact at least a portion of the swellable material 108 (e.g., shown in FIG. 2A). The at least one ring sensor 500 may be configured to detect one or more electrical properties (e.g., dielectric permittivity, magnetic permeability, and/or resistivity) of the swellable material 108.

Figure 6:
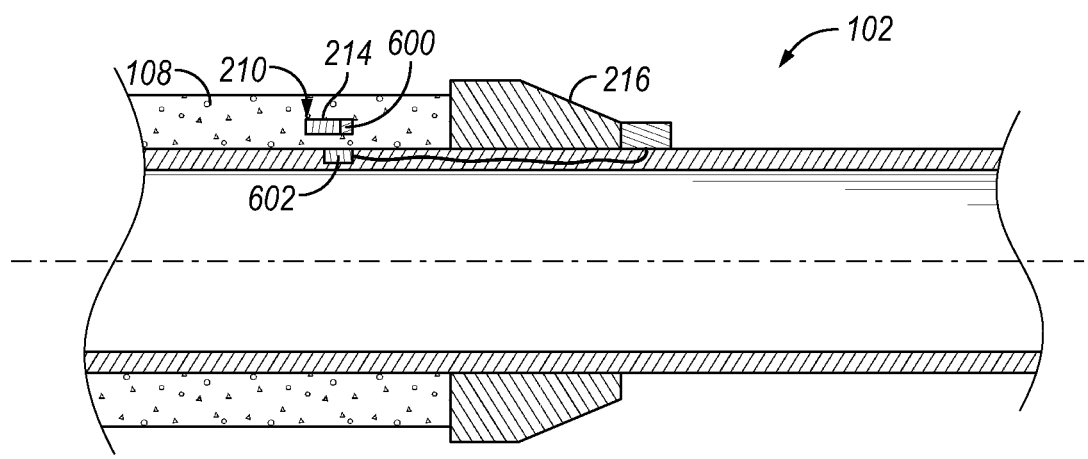
FIG. 6 illustrates at least one sensor disposed within a swellable packer seal, in accordance with some embodiments of the present disclosure.

FIG. 6 illustrates at least one sensor disposed within a swellable packer seal, in accordance with some embodiments of the present disclosure. The at least one sensor 210 may comprise a capacitive sensor 214 disposed within the swellable material 108. As set forth above, the capacitive sensor 214 may be configured to detect one or more electrical properties of the swellable material 108. For example, the capacitive sensor 214 may be configured to detect a dielectric permittivity of the swellable material 108. Moreover, the capacitive sensor 214 may be configured to output a frequency, via wireless radio-frequency identification 600 (RFID), to a receiver 602 secured to the swell packer 102. In the illustrated embodiment, the receiver 602 is secured to the mandrel 200. However, the receiver 602 may alternatively be secured to the lower end ring 216, the upper end ring 218, or any suitable portion of the swell packer 102. The receiver 602 may be configured to input the frequency sent from the capacitive sensor 214 and communicate data associated with the frequency to a downhole controller and/or surface operations. Moreover, the frequency output from the capacitive sensor 214 via the RFID 600 may change based at least in part on the detected dielectric permittivity of the swellable material 108. For example, the RFID 600 may output a first frequency corresponding to a first detected dielectric permittivity, a second frequency corresponding to a second detected dielectric permittivity, etc. As such, the degree of expansion of the swellable material 108 may be determined based at least in part on the frequency received from the capacitive sensor 214.

Accordingly, the present disclosure may provide a downhole packer system having at least one sensor to measure one or more electrical properties of the swellable seal of a packer to determine a degree of expansion of the swellable seal. The systems may include any of the various features disclosed herein, including one or more of the following statements.

Statement 1. A downhole packer system comprises a swellable material configured to expand to seal against a wellbore wall in response to exposure to downhole fluids; and at least one sensor disposed proximate the swellable material, wherein the at least one sensor is configured to measure one or more electrical properties of the swellable material to determine a degree of expansion of the swellable material.

Statement 2. The system of statement 1, wherein the degree of expansion of the swellable material is determined based at least in part on changes of the one or more electrical properties of the swellable material over time.

Statement 3. The system of statement 1 or statement 2, wherein the at least one sensor comprises an inductive sensor configured to detect a magnetic permeability of the swellable material, and wherein the degree of expansion of the swellable material is determined based at least in part on changes in the detected magnetic permeability of the swellable material.

Statement 4. The system of any preceding statement, wherein the at least one sensor comprises a high frequency inductive sensor configured to detect electrical resistance of the swellable material, and wherein the degree of expansion of the swellable material is determined based at least in part on changes in the detected electrical resistance of the swellable material.

Statement 5. The system of any preceding statement, wherein the at least one sensor comprises a capacitive sensor configured to detect a dielectric permittivity of the swellable material, and wherein the degree of expansion of the swellable material is determined based at least in part on changes in the detected dielectric permittivity of the swellable material.

Statement 6. The system of any preceding statement, wherein the at least one sensor is disposed within the swellable material, and wherein the at least one sensor is configured to output a frequency, via wireless radio-frequency identification (RFID), that changes based on a detected dielectric permittivity of the swellable material, a detected magnetic permeability of the swellable material, a detected electrical resistance of the swellable material, or some combination thereof.

Statement 7. The system of any preceding statement, wherein the at least one sensor comprises a series of point sensors disposed in at least one end ring positioned at an axial end of the swellable material.

Statement 8. The system of any preceding statement, wherein the at least one sensor comprises a ring sensor disposed in an end ring positioned at an axial end of the swellable material.

Statement 9. A downhole packer system comprises a mandrel; a swellable elastomer seal disposed about the mandrel and configured to expand to seal against a wellbore wall in response to absorbing a downhole fluid; and at least one sensor disposed proximate the swellable elastomer seal, wherein the at least one sensor is configured to measure changes in one or more electrical properties of the swellable elastomer seal to determine a degree of expansion of the swellable elastomer seal.

Statement 10. The system of statement 9, wherein the at least one sensor comprises a capacitive sensor configured to detect a dielectric permittivity of the swellable elastomer seal, and wherein the degree of expansion of the swellable elastomer seal is determined based at least in part on changes in the detected dielectric permittivity of the swellable elastomer seal.

Statement 11. The system of statement 9 or statement 10, wherein the swellable elastomer seal is doped with high dielectric particles to increase a dielectric permittivity of the swellable elastomer seal, and wherein the high dielectric particles comprise copper calcium titanate, barium titanate, alumina, magnesia, or some combination thereof.

Statement 12. The system of any of statements 9-11, wherein the downhole fluid comprises a hydrocarbon-based fluid, and wherein the dielectric permittivity of the swellable elastomer seal is configured to decrease in response to absorbing the hydrocarbon-based fluid.

Statement 13. The system of any of statements 9-11, wherein the downhole fluid comprises a water-based fluid, and wherein the dielectric permittivity of the swellable elastomer seal is configured to increase in response to absorbing the water-based fluid.

Statement 14. The system of any of statements 9-13, wherein the mandrel comprises an upper end ring and a lower end ring configured to restrain axial expansion of the elastomer, wherein the swellable elastomer seal is configured disposed axially between the upper end ring and the lower end ring.

Statement 15. The system of any of statements 9-14, wherein the at least one sensor comprises an inductive sensor configured to detect a magnetic permeability of the swellable elastomer seal, and wherein the degree of expansion of the swellable elastomer seal is determined based at least in part on changes in the detected magnetic permeability of the swellable elastomer seal.

Statement 16. The system of any of statements 9-15, wherein the swellable elastomer seal is doped with a magnetic responsive material to increase a magnetic permeability of the swellable elastomer seal, wherein magnetic responsive material comprises iron, nickel, chromium dioxide, or some combination thereof, and wherein the magnetic permeability of the swellable elastomer seal is configured to decrease in response to absorbing the downhole fluid.

Statement 17. A downhole packer system comprises a mandrel; a swellable metal seal disposed about the mandrel, wherein the swellable metal seal is configured to undergo a chemical reaction in response to exposure to downhole fluids, wherein the swellable metal seal is configured to expand to seal against a wellbore wall in response to the chemical reaction; and at least one sensor disposed proximate the swellable metal seal, wherein the at least one sensor is configured to measure changes in one or more electrical properties of the swellable metal seal to determine a degree of expansion of the swellable metal.

Statement 18. The system of statement 17, wherein the at least one sensor comprises a capacitive sensor configured to detect a dielectric permittivity of the swellable metal seal, and wherein the degree of expansion of the swellable metal seal is determined based at least in part on changes in the detected dielectric permittivity of the swellable metal seal.

Statement 19. The system of statement 17 or statement 18, wherein the at least one sensor comprises a high frequency inductive sensor configured to detect electrical resistance of the swellable metal seal, and wherein the degree of expansion of the swellable metal seal is determined based at least in part on changes in the detected electrical resistance of the swellable metal seal.

Statement 20. The system of any of statements 17-19, wherein a rate of change of the one or more electrical properties is substantially zero at full expansion of the swellable metal seal.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A downhole packer system, comprising:
   a swellable elastomer configured to expand and seal against a wellbore wall in response to exposure to at least one downhole fluid;
   one or more sensors disposed proximate the swellable elastomer, wherein the one or more sensors are configured to measure dielectric permittivity and/or magnetic permeability of the swellable elastomer, wherein the one or more sensors comprise a series of point sensors disposed in one or more end rings positioned at one or more axial ends of the swellable elastomer, and wherein the swellable elastomer is doped with high dielectric particles to increase the dielectric permittivity of the swellable elastomer; and
   one or more processors communicatively coupled to the one or more sensors and configured to determine degree of expansion of the swellable elastomer based at least in part on one or more correlations between swelling and the measured dielectric permittivity and/or magnetic permeability, comprising to determine a rate of change of the dielectric permittivity and/or magnetic permeability based on the measured dielectric permittivity and/or magnetic permeability and determine the rate of change as substantially constant indicating the swellable elastomer is fully expanded.

2. The system of claim 1, wherein the one or more processors are configured to determine degree of expansion of the swellable elastomer based at least in part on one or more changes to the dielectric permittivity and/or magnetic permeability of the swellable elastomer over time.

3. The system of claim 1, wherein the one or more sensors comprise one or more inductive sensors configured to measure the magnetic permeability of the swellable elastomer, and wherein the one or more processors are configured to determine degree of expansion of the swellable elastomer based at least in part on one or more changes to the measured magnetic permeability of the swellable elastomer.

4. The system of claim 1, wherein the one or more sensors comprise one or more high frequency inductive sensors configured to detect electrical resistance of the swellable elastomer, and wherein the one or more processors are configured to determine degree of expansion of the swellable elastomer additionally based at least in part on one or more changes to a detected electrical resistance of the swellable elastomer.

5. The system of claim 1, wherein the one or more sensors comprise one or more capacitive sensors configured to measure the dielectric permittivity of the swellable elastomer, and wherein the one or more processors are configured to determine the degree of expansion of the swellable elastomer based at least in part on one or more changes to the measured dielectric permittivity of the swellable elastomer.

6. The system of claim 1, wherein the series of point sensors comprises three or more point sensors about a central axis of the one or more end rings.

7. The system of claim 1, wherein the one or more end rings comprise an upper end ring and/or a lower end ring.

8. The system of claim 1, wherein the one or more processors are configured to determine degree of expansion based at least in part on the rate of change of dielectric permittivity of the swellable elastomer.

9. A downhole packer system, comprising:
a mandrel;
a swellable elastomer seal disposed about the mandrel and configured to expand and seal against a wellbore wall in response to absorbing a downhole fluid; and
one or more sensors disposed proximate the swellable elastomer seal, wherein the one or more sensors are configured to measure dielectric permittivity and/or magnetic permeability of the swellable material, wherein the one or more sensors comprise a series of point sensors disposed in one or more end rings positioned at one or more axial ends of the swellable elastomer seal, wherein the swellable elastomer seal is doped with one or more magnetic responsive materials to increase the magnetic permeability of the swellable elastomer seal; and one or more processors communicatively coupled to the one or more sensors, wherein the one or more processors are configured to determine degree of expansion of the swellable elastomer seal based at least in part on one or more measured changes to dielectric permittivity and/or magnetic permeability of the swellable elastomer seal by the one or more sensors, comprising to determine a rate of change of the dielectric permittivity and/or magnetic permeability based on the measured changes to dielectric permittivity and/or magnetic permeability and determine the rate of change as substantially constant indicating the swellable elastomer seal is fully expanded.

10. The system of claim 9, wherein the one or more sensors comprise one or more capacitive sensors configured to detect the dielectric permittivity of the swellable elastomer seal, and wherein the one or more processors are configured to determine degree of expansion of the swellable elastomer seal based at least in part on one or more changes to the detected dielectric permittivity of the swellable elastomer seal.

11. The system of claim 9, wherein the one or more magnetic responsive materials comprise ferromagnetic particles.

12. The system of claim 11, wherein the downhole fluid comprises a hydrocarbon-based fluid, and wherein the dielectric permittivity of the swellable elastomer seal decreases in response to absorbing of the hydrocarbon-based fluid.

13. The system of claim 9, wherein the downhole fluid comprises a water-based fluid, and wherein the dielectric permittivity of the swellable elastomer seal increases in response to absorbing the water-based fluid.

14. The system of claim 9, wherein the mandrel comprises the one or more end rings comprising an upper end ring and a lower end ring configured to restrain axial expansion of the swellable elastomer seal, wherein the swellable elastomer seal is disposed axially between the upper end ring and the lower end ring.

15. The system of claim 9, wherein the one or more sensors comprise one or more inductive sensors configured to detect the magnetic permeability of the swellable elastomer seal, and wherein the one or more processors are configured to determine degree of expansion of the swellable elastomer seal based at least in part on one or more changes to detected magnetic permeability of the swellable elastomer seal.

16. The system of claim 9, wherein the one or more magnetic responsive materials comprise iron, nickel, chromium dioxide, or some combination thereof, and wherein the magnetic permeability of the swellable elastomer seal decreases in response to absorbing of the downhole fluid.

* * * * *